US010318396B2

(12) United States Patent
He et al.

(10) Patent No.: US 10,318,396 B2
(45) Date of Patent: Jun. 11, 2019

(54) TECHNOLOGIES FOR TEMPERATURE MEASUREMENT OF A PROCESSOR

(71) Applicant: Intel Corporation, Santa Clara, CA (US)

(72) Inventors: Jiangqi He, Mesa, AZ (US); Hongfei Yan, Mesa, AZ (US); Chunlei Guo, Folsom, CA (US); Wei Shen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 14/866,884

(22) Filed: Sep. 26, 2015

(65) Prior Publication Data
US 2017/0091061 A1 Mar. 30, 2017

(51) Int. Cl.
*G01K 7/36* (2006.01)
*G01K 11/26* (2006.01)
*G06F 11/30* (2006.01)

(52) U.S. Cl.
CPC ........... *G06F 11/3058* (2013.01); *G01K 7/36* (2013.01); *G01K 11/26* (2013.01)

(58) Field of Classification Search
CPC ........ G06F 11/3058; G01K 11/26; G01K 7/36
See application file for complete search history.

(56) References Cited

U.S. PATENT DOCUMENTS

| 8,635,470 | B1 | 1/2014 | Kraipak | |
| 2003/0115013 | A1* | 6/2003 | Dendinger | G06F 1/206 |
| | | | | 702/132 |
| 2008/0150645 | A1 | 6/2008 | McCorquodale | |
| 2009/0085133 | A1* | 4/2009 | Doan | G06K 19/07749 |
| | | | | 257/428 |
| 2009/0175313 | A1* | 7/2009 | Kordic | G01K 7/32 |
| | | | | 374/117 |
| 2010/0177801 | A1 | 7/2010 | Geren | |

FOREIGN PATENT DOCUMENTS

WO 2005-006101 1/2005

OTHER PUBLICATIONS

International Search Report for PCT/US16/048848, dated Nov. 30, 2016 (4 pages).
Written Opinion for PCT/US16/048848, dated Nov. 30, 2016 (6 pages).

* cited by examiner

*Primary Examiner* — Natalie Huls
*Assistant Examiner* — Janice M Soto
(74) *Attorney, Agent, or Firm* — Barnes & Thornburg LLP

(57) ABSTRACT

A method and device for temperature measurement of a processor is disclosed. A temperature-sensing circuit of the processor may have an associated resonance frequency, wherein the resonance frequency depends on a temperature of the temperature-sensing circuit. A temperature of the temperature-sensing circuit may be determined by determining the resonance frequency of the temperature-sensing circuit.

25 Claims, 5 Drawing Sheets

US 10,318,396 B2

TECHNOLOGIES FOR TEMPERATURE MEASUREMENT OF A PROCESSOR

BACKGROUND

Computers have become ubiquitous in a variety of applications, from supercomputers to smart phones. One reason for the growth of computers and computing resources is Moore's law, which provides that transistor density grows exponentially. However, as the number of transistors on a chip grows, so does the energy dissipated on that chip.

Computer processors employ voltage sources to provide power for operation of components of the computer processor. In some computer processors, one or more of the voltage sources may be embodied as a voltage regulator, which may be fully integrated on the processor. Such a voltage regulator supplies a large amount of power to operate the numerous transistors and devices on the processor. Many such voltage regulators contain an integrated inductor, through which high current may pass during operation. The presence of such high current can cause local heating at the inductor, and possibly overheating of the inductor resulting in failure of the voltage regulator or poor performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
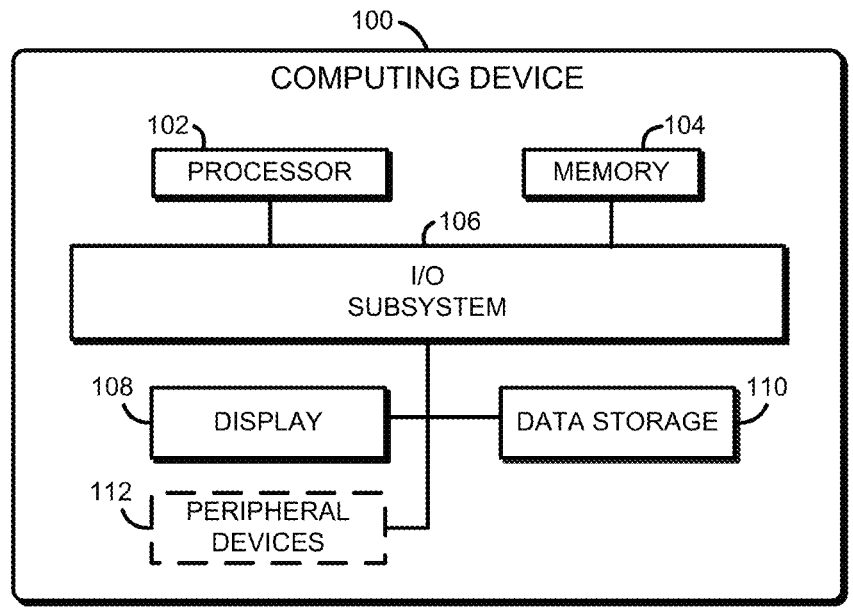
FIG. 1 is a simplified block diagram of at least one embodiment of a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

Some or all disclosed embodiments may be implemented, in some cases, in hardware, firmware, software, or any combination thereof. Some or all disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. In the drawings, connections between some elements may be shown. However, it should be appreciated that depicting such specific connections does not preclude additional connections between elements that may not be shown.

Some or all of the enclosed embodiments are related to temperature. Since the physical property of temperature is related to an average property of a large number of particles, a single system, object, or collection of objects may have more than one temperature. For example, if a system includes several components, the system may have several temperatures associated with it, such as the average temperature of the entire system, the average temperature of one or more components, or the average temperature of a portion of a component. For example, a temperature-sensing circuit 312 may have several components, each of which may be located at a different location, and may have a different temperature. Unless otherwise specified, referring to a temperature of an object, element, or system in this disclosure may refer to a temperature of any portion of that object, element, or system, or to the temperature of the entire object, element, or system.

Referring now to FIG. 1, an illustrative computing device 100 includes a processor 102 having one or more voltage regulator circuits 212 (see FIG. 2) configured to provide a relatively constant voltage to other circuits and components of the processor 102. As discussed in more detail below, the voltage regulator circuit 212 includes a temperature sensing circuit 312 (see FIGS. 3 and 4) configured to monitor a temperature of the processor 102. To do so, the temperature sensing circuit 312 includes one or more components having a resonance frequency that varies with temperature (i.e., the resonance frequency of the one or more components is temperature-dependent). As such, the temperature of the processor 102 (e.g., the temperature of the corresponding voltage regulator circuit 212) may be determined based on the present resonance frequency of the temperature sensing circuit 312 and/or components included therein.

The computing device 100 may be embodied as any type of computing device having one or more processors. For example, the computing device 100 may be embodied as, without limitation, a desktop computer, a server computer, a notebook computer, a laptop computer, a digital camera, a smartphone, a cellular phone, a tablet computer, a wearable computer, smart eyeglasses, a smart watch, a head-mounted display unit, a handset, a messaging device, a multiprocessor system, a processor-based system, a consumer electronic device, and/or any other computing device including a processor. The illustrative computing device 100 includes the processor 102), a memory 104, an I/O subsystem 106, a display 108, a data storage 110, and one or more peripheral devices 112. Of course, the computing device 100 may include additional or other components in other embodiments based on, for example, the particular type of computing device 100.

The processor 102 may be embodied as any type of processor capable of processing data of the computing device 100. For example, the processor 102 may be embodied as a single or multi-core processor(s), a single or multi-socket processor, a digital signal processor, a microcontroller, or other processor or processing/controlling circuit. Similarly, the memory 104 may be embodied as any type of volatile or non-volatile memory or data storage capable of performing the functions described herein. In operation, the memory 104 may store various data and software such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the computing device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the computing device 100, such as the data storage 110, on a single integrated circuit chip.

The display 108 of the computing device 100 may be embodied as any type of display capable of displaying digital information such as a liquid crystal display (LCD), a light emitting diode (LED), a plasma display, a cathode ray tube (CRT), an image projector (e.g., 2D or 3D), a laser projector, a touchscreen display, and/or other type of display device.

The data storage 110 may be embodied as any type of device or devices configured for the short-term or long-term storage of data. For example, the data storage 110 may include any one or more memory devices and circuits, memory cards, hard disk drives, solid-state drives, or other data storage devices.

As discussed above, the computing device 100 may also include one or more peripheral devices 112 in some embodiments. Such peripheral devices 112 may include any type of peripheral device commonly found in a computing device, for example, a hardware keyboard, input/output devices, peripheral communication devices, and/or other peripheral devices.

Figure 2:
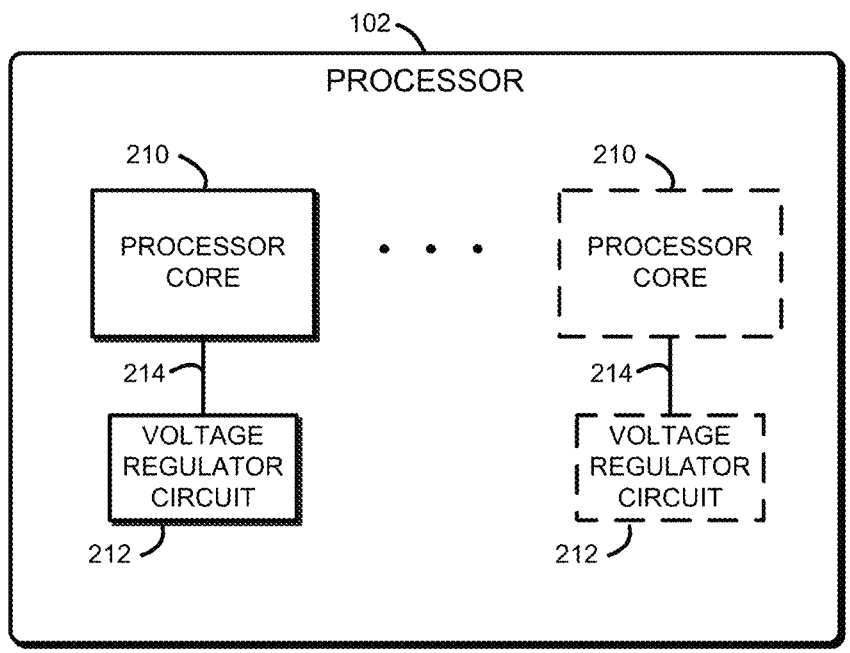
FIG. 2 is a simplified block diagram of at least one embodiment of a processor of the computing device of FIG. 1 having one or more processor cores, each of which may be associated with a corresponding voltage regulator circuit.

Referring now to FIG. 2, the illustrative processor 102 of the computing device 100 includes a processor core 210 and a corresponding voltage regulator circuit 212, connected by an interconnection 214. In some embodiments, the processor 102 may contain a plurality of processor cores 210 as shown in phantom in FIG. 2, each of which may be associated with a corresponding voltage regulator circuit 212. In other embodiments, a single voltage regulator circuit 212 may be associated with multiple of processor cores 210.

In some embodiments, a portion or all of the voltage regulator circuit 212 may be packed together with the corresponding processor core 210, either on the same substrate or on different substrates. Additionally, in embodiments including multiple voltage regulator circuits 212, some voltage regulator circuits 212 may be packed on the same substrate as one or more processor cores 210, while others are not. Any suitable semiconductor fabrication or packaging techniques may be used to fabricate and/or package portions of the processor 102 such as the processor core 210 and/or the voltage regulator circuit 212.

As discussed above, the illustrative voltage regulator circuit 212 is configured to provide a relatively constant or regulated power to the processor core 210 via the interconnection 214. Additionally or alternatively, the voltage regulator circuit 212 may be able to communicate with the processor core 210 over the connection 214 in some embodiments. Communication from the voltage regulator circuit 212 to the processor core 210 may include temperature information and/or instructions adjusting operational characteristics of the processor core 210. In some embodiments, such communication includes instructions adjusting the voltage level from the processor core 210 to the voltage regulator circuit 212.

Figure 3:
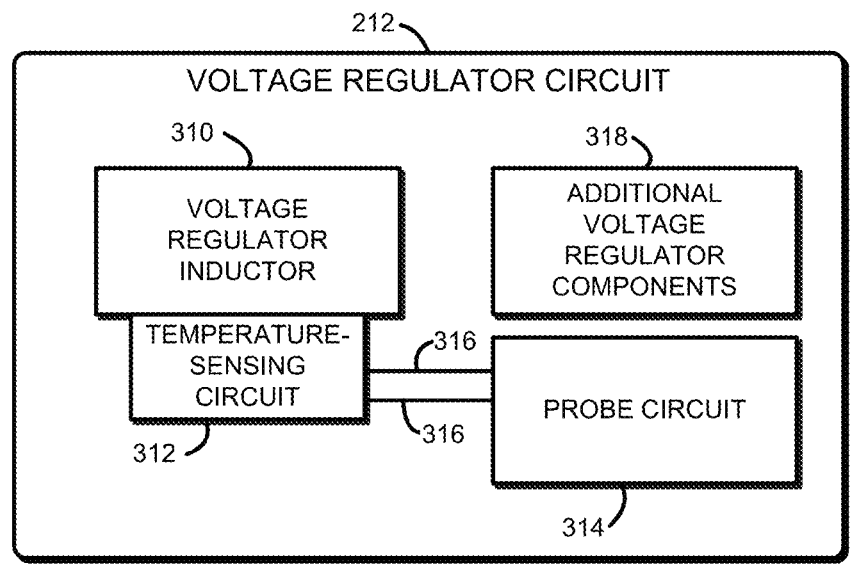
FIG. 3 is a simplified block diagram of at least one embodiment of a voltage regulator circuit of the processor of FIG. 2.

Referring now to FIG. 3, an illustrative voltage regulator circuit 212 includes a voltage regulator inductor 310, the temperature-sensing circuit 312, a probe circuit 314, and additional voltage regulator components 318, which may be operatively coupled to the voltage regulator inductor 310. The voltage regulator inductor 310 may be embodied as a nonmagnetic-core (e.g., air-core) inductor or a magnetic-core inductor. In some embodiments, the voltage regulator inductor 310 may have a defined target, target range, or threshold temperature for proper operation. For example, in one embodiment, the target or threshold temperature for the voltage regulator inductor 310 may be 90, 100, or 110 degrees Celsius. However, in other embodiments, the target or threshold temperature may be higher or lower.

The portion of the voltage regulator circuit 212 configured to regulate the voltage supplied to the corresponding processor core 210 is illustratively represented in FIG. 3 by the voltage regulator inductor 310 and the additional voltage regulator components 318. The voltage may be regulated using any suitable method of voltage regulation, such as a simple "feed-forward" design. Negative feedback control loops may also be used, and electromechanical or electronic components may also be used. The voltage regulated by the voltage regulator circuit 212 is embodied as a direct current (DC) voltage in the illustrative embodiment, but may be embodied as an alternating current (AC) voltage in other embodiments. Additionally, voltage regulator circuit 212 may be embodied as a linear or nonlinear regulator. In some embodiments, the voltage regulator circuit 212 may have an associated switching frequency indicative of the frequency at which one or more internal switches (e.g., transistors) of the voltage regulator circuit 212 is switched. As such, the additional voltage regulator components 318 may include any additional components commonly found in a voltage regulator including, but not limited to capacitors, resistors, additional inductors, and logic elements to provide control, feedback, and/or communication.

In the illustrative embodiment, at least a portion of the temperature-sensing circuit 312 is thermally coupled to the voltage regulator inductor 310. That is, the temperature-sensing circuit 312 may be positioned, relative to the voltage regulator inductor 310, such that at least one sensing components of the temperature-sensing circuit 312 (e.g., the temperature-dependent capacitor 402 of FIG. 4) is within a reference distance of the voltage regulator inductor 310. For example, one or more sensing components of the temperature-sensing circuit 312 may be within 0.1, 1, 10, 100, 500, or 1,000 micrometers from the voltage regulator inductor 310. In the illustrative embodiment, the temperature-dependent capacitor 402 is located about 200 micrometers from the voltage regulator inductor 310. Of course, the reference distance between the one or more sensing components and the voltage regulator inductor 310 maybe lesser or greater in other embodiments.

Additionally, in some embodiments, one or more of the sensing components of the temperature-sensing circuit 312 (e.g., the temperature-dependent capacitor 402 of FIG. 4) may be configured or designed to occupy a reference area (e.g., a "footprint"). For example, the one or more sensing components may be configured to occupy an area less than 1, 10, 100, or 1,000 square micrometers, or may occupy an area than 0.01, 0.1, or 1 square millimeters. Of course, in other embodiments, the one or more sensing component may have a greater or smaller footprint.

In the illustrative embodiment, the temperature-sensing circuit 312 has an associated resonance frequency, which is temperature dependent as discussed in more detail below. To improve measurability, the temperature-sensing circuit 312 may be configured such that the associated resonance frequency at a target temperature is higher than the switching frequency of the voltage regulator circuit 212 by a reference amount. For example, the temperature-sensing circuit 312 may be configured such that the associated resonance frequency at a target temperature is 2, 3, 5, or 10 times higher than the switching frequency associated with the voltage regulator circuit 212.

The probe circuit 314 is configured to probe the temperature-sensing circuit 312 via circuit connections 316 to determine a temperature associated with at least one component of the temperature-sensing circuit 312. To do so, in the illustrative embodiment, the probe circuit 314 determines the resonance frequency of the temperature-sensing circuit 312. In some embodiments, a single probe circuit 314 may be configured to probe more than one temperature-sensing circuit 312. For example, a single probe circuit 314 may be configured to probe two or more different temperature-sensing circuits 312, each of which may be thermally coupled to different corresponding voltage regulator inductors 310.

Figure 4:
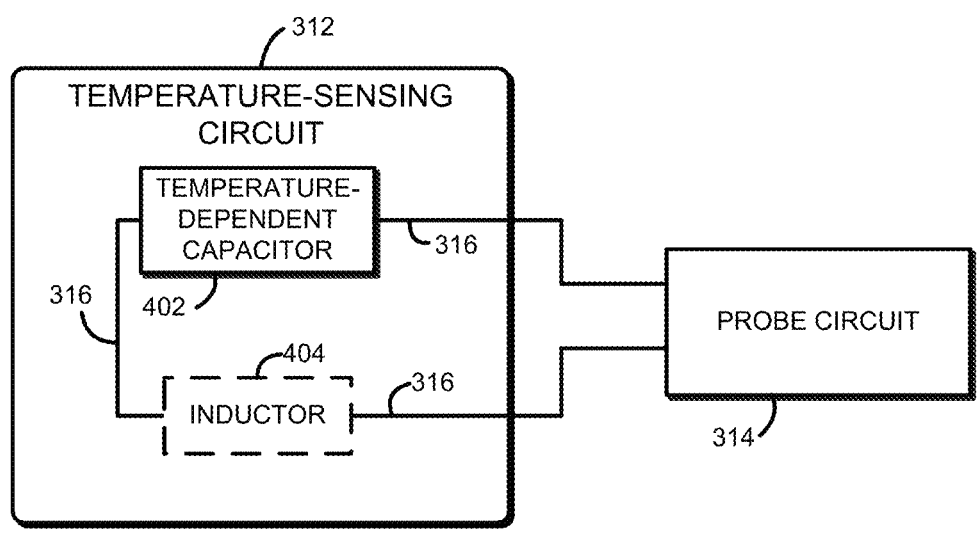
FIG. 4 is a simplified block diagram of at least one embodiment of a temperature-sensing circuit of the voltage regulator circuit of FIG. 3.

Referring now to FIG. 4, in the illustrative embodiment, the temperature-sensing circuit 312 includes a temperature-dependent capacitor 402, which may be thermally coupled to the voltage regulator inductor 310 as discussed above. The temperature-dependent capacitor 402 includes a dielectric having a permittivity of the dielectric that is temperature-dependent. For example, the permittivity ε may depend on temperature according to the equation:

$$\varepsilon = \varepsilon_0 + k_T * T,$$

where $\varepsilon_0$ is the permittivity at 0 degrees Celsius, $k_T$ is a coefficient for the change in permittivity per degree Celsius, and T is the temperature in degrees Celsius. It should be appreciated that because the permittivity of the temperature-dependent capacitor 402 is temperature-dependent, the overall capacitance of the temperature-dependent capacitor 402 is also temperature-dependent and will change in response to a change in temperature of the temperature-dependent capacitor 402. As such, a change in capacitance of the temperature-dependent capacitor 402 will cause a corresponding change in the resonance frequency of the temperature-sensing circuit 312.

Like most electrical circuits, the temperature-sensing circuit 312 also has an associated inductance. Additionally, like other electrical circuits, the inductance of the temperature-sensing circuit 312 may include or be due to parasitic inductance. However, some embodiments of the temperature-sensing circuit 312 include an inductor 404, which contributes to the associated inductance. In some embodiments, the parasitic inductance may be a desirable and intended effect. For example, one or more elements of the temperature-sensing circuit 312 (such as the temperature-dependent capacitor 402 or the circuit connectors 316) may be configured such that the parasitic inductance affects the resonance frequency of the temperature-sensing circuit 312. In some embodiments, some elements such as the circuit connectors 316 and inductor 404 may be configured such that the mutual inductance with the voltage regulator inductor 310 is reduced, as discussed in more detail in regards to FIG. 7 below.

In the illustrative embodiment, the temperature-sensing circuit 312 has or is otherwise associated with a resonance frequency, which is due to inductance (parasitic and/or of the inductor 404) of the temperature-sensing circuit 312 and the capacitance of the temperature-dependent capacitor 402. As such, as discussed above, the resonance frequency of the temperature-sensing circuit 312 is dependent on temperature of the temperature-dependent capacitor 402. Additionally, in the illustrative embodiment, the resonance frequency of the temperature-sensing circuit 312 is more sensitive to a change in temperature of the temperature-dependent capacitor 402 than it is to a change in temperature of the inductor 404 or other elements (e.g., parasitic inductance) contributing to the inductance of the temperature-sensing circuit 312. As a result, in the illustrative embodiment, the inductor 404 (if included) may be located relatively far from the voltage regulator inductor 310 and/or temperature-dependent capacitor 402 without significantly affecting the dependence of the resonance frequency on the temperature of the voltage regulator inductor 310. For example, the inductor 404 may be located a more than 1, 10, 100, 1,000, or 10,000 micrometers from the voltage regulator inductor 310 or temperature-dependent capacitor 402 in some embodiments. For example, in some other embodiments, the inductor 404 may be located in the range 1-10, 10-100, 100-1,000, or 1,000-10,000 micrometers from the voltage regulator inductor 310 or temperature-dependent capacitor 402. In embodiments exhibiting parasitic inductance, some or all of the components contributing to the parasitic inductance (e.g., the circuit connectors 316) may be located more away from voltage regulator inductor 310 or temperature-dependent capacitor 402 (e.g., more than 1, 10, 100, 1,000, or 10,000 micrometers away.) Again, in other embodiments, such components may be may be located in the range 1-10, 10-100, 100-1,000, or 1,000-10,000 micrometers from the voltage regulator inductor 310 or temperature-dependent capacitor 402.

Figure 5:
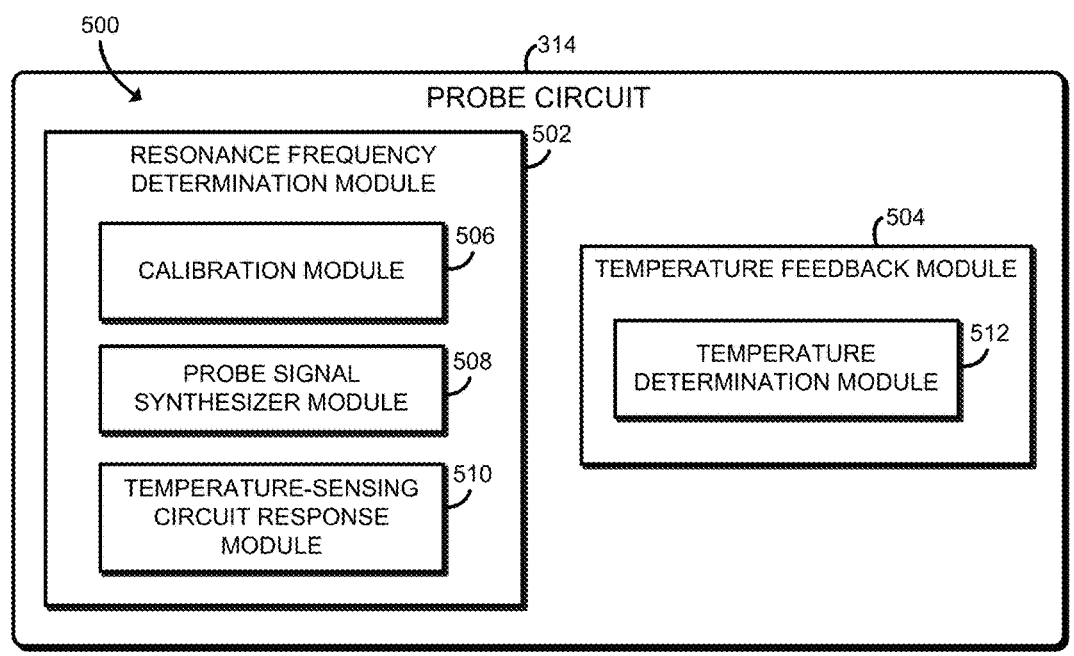
FIG. 5 is a block diagram of at least one embodiment of an environment that may be established by a probe circuit of the voltage regulator circuit of FIG. 3.

Referring now to FIG. 5, in use, the probe circuit 314 may establish an environment 500. The illustrative environment 500 includes a resonance frequency determination module 502 and a temperature feedback module 504. The illustrative resonance frequency determination module 502 includes a calibration module 506, a probe signal synthesizer module 508, and a temperature-sensing circuit response module 510. The illustrative temperature feedback module 504 includes a temperature determination module 512. The various modules of the environment 500 may be embodied as hardware, software, firmware, or a combination thereof. For example, the various modules, logic, and other components of the environment 500 may form a portion of, or otherwise be established by, the processor core 210 or other hardware components of the processor 102. As such, in some embodiments, one or more of the modules of the environment 500 may be embodied as circuitry or collection of electrical devices (e.g., a resonance frequency determination circuit 502, a calibration circuit 506, a temperature feedback circuit 504, etc.). It should be appreciated that, in such embodiments, one or more of the resonance frequency determination circuit 502, the calibration circuit 506, and/or the temperature feedback circuit 504 may form a portion of one or more of the processor 102, processor core 210, and/or the additional voltage regulator components 318. Additionally, in some embodiments, one or more of the illustrative modules may form a portion of another module and/or one or more of the illustrative modules may be independent of one another.

In use, the resonance frequency determination module 502 is configured to determine the resonance frequency of the temperature-sensing circuit 312 based on response of the temperature-sensing circuit 312 to a probe signal. To do so, the calibration module 506 is configured to determine the resonance frequency of the temperature-sensing circuit 312 when a temperature of the temperature-sensing circuit 312 is known by other means, as described in more detail below so as to establish a known reference point.

The probe signal synthesizer module 508 is configured to generate a probe signal and inject the probe signal into the temperature-sensing circuit 312. In some embodiments, the probe signal synthesizer module 508 may synthesize the probe signal from a set or range of frequencies. In other embodiments, the probe signal synthesizer module 508 may be configured to synthesize a probe signal of a fixed frequency. In still other embodiments, the probe signal synthesizer module 508 may sweep the probe signal across a range of frequencies. The probe signal synthesized by the probe signal synthesizer module 508 may be provided to the temperature-sensing circuit 312 through the circuit connectors 316.

The temperature-sensing circuit response module 510 is configured to measure the magnitude of the response of the temperature-sensing circuit 312 to the probe signal provided by the probe signal synthesizer module 508. In the illustrative embodiment, the probe signal provided to the temperature-sensing circuit 312 may be embodied as a signal having a fixed peak-to-peak voltage, and the response to be measured by the temperature-sensing circuit response module 510 is embodied as the current flowing through the temperature-sensing circuit 312. However, in other embodiments, the probe signal provided and the response measured may include signals having different or additional characteristics.

In the illustrative embodiment, the resonance frequency determination module 502 is configured to determine a resonance frequency of the temperature-sensing circuit 312 in response to at least one measurement by the temperature-sensing circuit response module 510. The resonance frequency determination module 502 may subsequently provide the determined resonance frequency to the temperature feedback module 504. The temperature determination module 512 of the temperature feedback module 504 is configured to determine a temperature of the temperature-sensing circuit 312 based on the resonance frequency. In response, the temperature feedback module 504 may provide a feedback signal to the processor core 210 based on the determined temperature. In some embodiments, the feedback signal includes the value of the determined temperature. Additionally or alternatively, the feedback signal may include an instruction to adjust an operational characteristic of the processor core 210. For example, if the determined temperature exceeds a threshold, the feedback signal may include an instruction to the processor core 210 to reduce its power consumption. In some embodiments, the temperature feedback module 504 may be able to receive a response signal from the processor core 210 in response to the processor core 210 receiving the feedback signal. For example, the processor core 210 may be configured to instruct the temperature feedback module 504 to change the voltage output of the voltage regulator circuit 212, based on the determined temperature.

Figure 6:
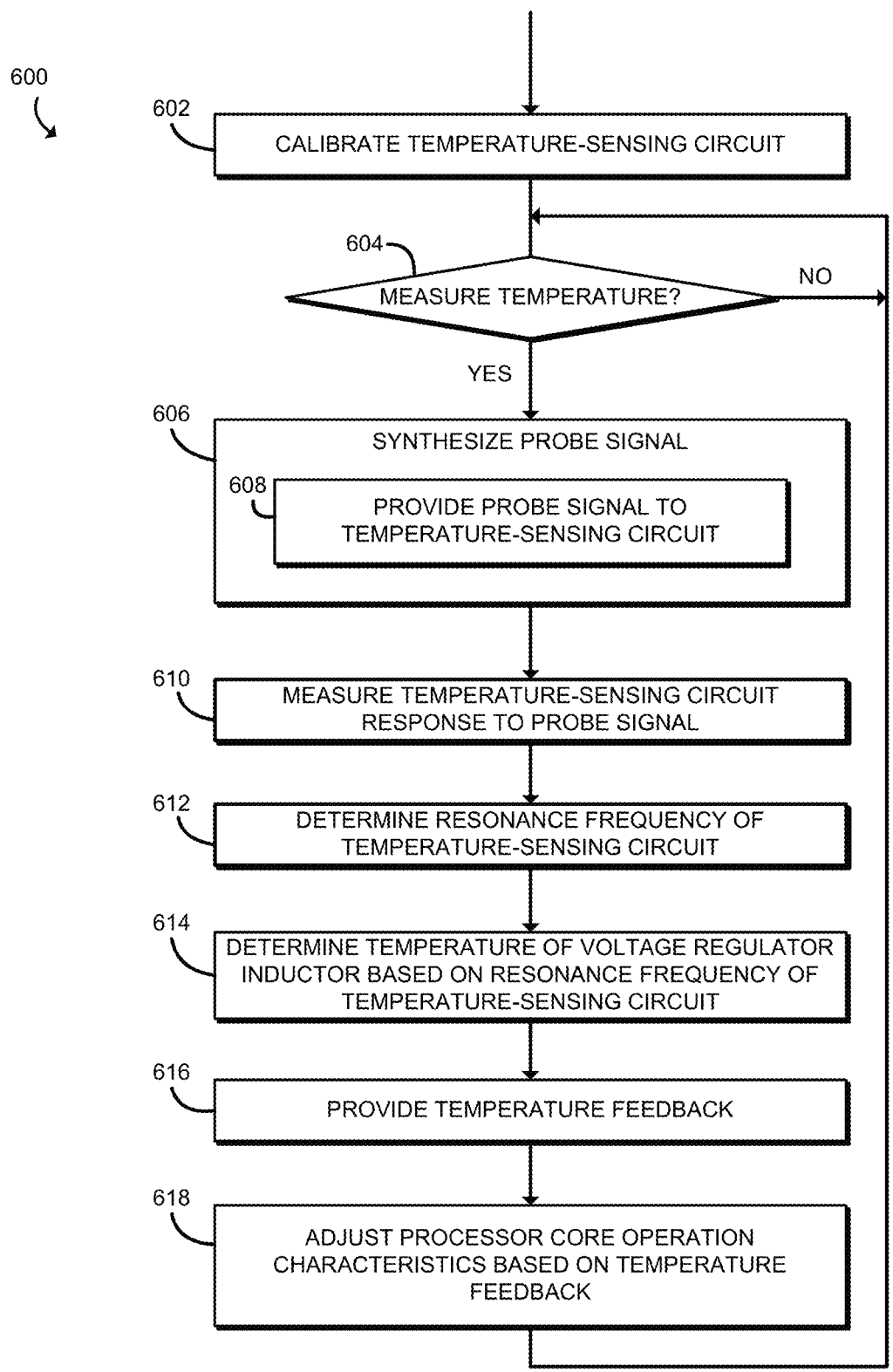
FIG. 6 is a simplified flow diagram of at least one embodiment of a method for determining a temperature of a processor that may be executed by the probe circuit.

Referring now to FIG. 6, in use, the computing device 100 may execute a method 600 for monitoring a temperature of a processor 102 of the computing device 100. The method 600 begins with block 602, in which the temperature-sensing circuit 312 is calibrated. In the illustrative embodiment, this calibration may be done by the calibration module 506. To do so, the calibration module 506 may determine the resonance frequency of the temperature-sensing circuit 312 when the temperature-sensing circuit 312 is at a known temperature as discussed above. For example, the temperature-sensing circuit 312 may be known to be at the same temperature as a second temperature sensor located at a different location on the processor 102 when the computing device 100 is first powered on. The calibration module 506 may determine a temperature of the second temperature sensor and, based on the measured temperature of the second temperature sensor and the resonance frequency of the temperature-sensing circuit 312, calibrate the temperature-sensing circuit 312. Any calibration data may be stored in the processor 102 or other data storage. In some embodiments, the calibration may be performed only once at the initial power-up of the processor 102. However, in other embodiments, the calibration processor may be performed periodically or in response to certain conditions or criteria.

After the temperature-sensing circuit 312 has been calibrated or if no calibration is required, the probe circuit 216 determines whether to measure a temperature of the processor 102 in block 604. The processor temperature may be measured continuously, continually, or periodically. For example, in some embodiments, the temperature may be measured when requested by the processor 102.

If the probe circuit 216 is to measure the temperature, the method 600 proceeds to block 606 in which the probe signal synthesizer module 508 synthesizes a probe signal having a frequency at or near the resonance frequency of the temperature-sensing circuit 312 at a target temperature. In some embodiments, this may be done by synthesizing several signals having different frequencies as discussed above. For example, the signals may have frequencies covering a range of values at or near the resonance frequency. In other embodiments, the probe signal may have a single frequency. For example, the probe signal may have a frequency having a fixed relationship with the resonance frequency of the temperature-sensing circuit 312 at a target temperature, such as 10% more or less than resonance frequency. In some embodiments, the fixed relationship may be based on the Q value of the temperature-sensing circuit 312. For example, the probe signal may be at or near a frequency that causes the response to be half the magnitude of the response on resonance. In other embodiments, the frequency of the probe signal may be continuously or piece-wise swept across a range of frequencies. The signal may be an oscillating voltage, current, or some combination thereof. The signal may have a fixed peak magnitude for each frequency synthesized, or the magnitude may be different for different frequencies. In block 608, the synthesized probe signal is injected or otherwise provided to the temperature-sensing circuit 312.

As discussed above, the temperature-sensing circuit 312 exhibits a response as a result of the probe signal, and such response is measured by the temperature-sensing circuit response module 510. Illustratively, the response is measured for one or more of the frequencies that are synthesized. In other embodiments, the response is sampled a number of times as the frequency of the probe signal is swept across a range of frequencies. The temperature-sensing circuit response module 510 may measure a current that is a response to a fixed voltage probe signal, may measure a voltage that is a response to a fixed current, may measure a phase of the response with respect to the probe signal, or may measure a combination thereof.

After the response of the temperature-sensing circuit 312 has been measured in block 610, the resonance frequency determination module 502 determines the resonance frequency of the temperature-sensing circuit 312 in block 612. In some embodiments, the resonance frequency is determined by fitting the measured response to a model. Any suitable algorithm may be used for the fitting, such as least-squares, Levenberg-Marquadt, or other fitting algorithms. In some embodiments, the model may have a number of free parameters equal to the number of measured responses, leading to one preferred fit. After determining the resonance frequency of the temperature-sensing circuit 312, the temperature determination module 512 determines the temperature based on the determined resonance frequency and the calibration in to block 614.

In block 616, the temperature feedback module 504 provides the determined temperature as feedback to the processor core 210. In some embodiments, the temperature may be provided to the voltage regulator circuit 212 or another element of the computing device 100. Additionally, in some embodiments in block 618, an operational characteristic of the processor core 210 is adjusted based on the temperature feedback. Further, in some embodiments, an operational characteristic of the voltage regulator circuit 212 or another element of the computing device 100 may be adjusted.

Figure 7:
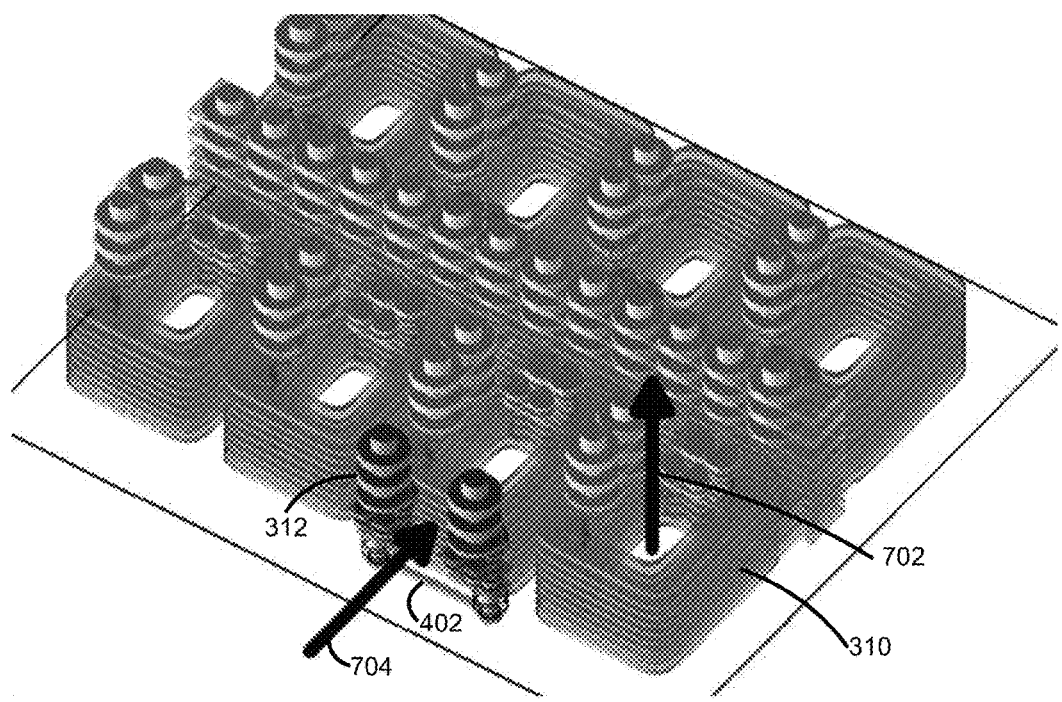
FIG. 7 is an illustration of at least one embodiment of the voltage regulator inductor and the temperature sensing circuit of FIG. 3.

Referring now to FIG. 7, an illustration is presented of an embodiment of a voltage regulator inductor 310 and a portion of the temperature-sensing circuit 312. The circuit connectors 316 are shown as microvias, and the temperature-dependent capacitor 402 is shown as well. When current passes through the voltage regulator inductor 310, a magnetic field is created which has a primary axis perpendicular to the plane of the coils of the voltage regulator inductor 310. This axis is shown with an arrow 702. When current passes through the temperature-sensing circuit 312, a magnetic field is also created due to parasitic inductance. The primary axis of this field is perpendicular to the plane of the current, as shown with arrow 704. In order to reduce the mutual inductance between the voltage regulator inductor 310 and the temperature-sensing circuit 312, the path of the temperature-sensing circuit 312 may be configured such that the arrow 702 and the arrow 704 representing the primary axes of the respective fields are perpendicular or substantially perpendicular.

Figure 8:
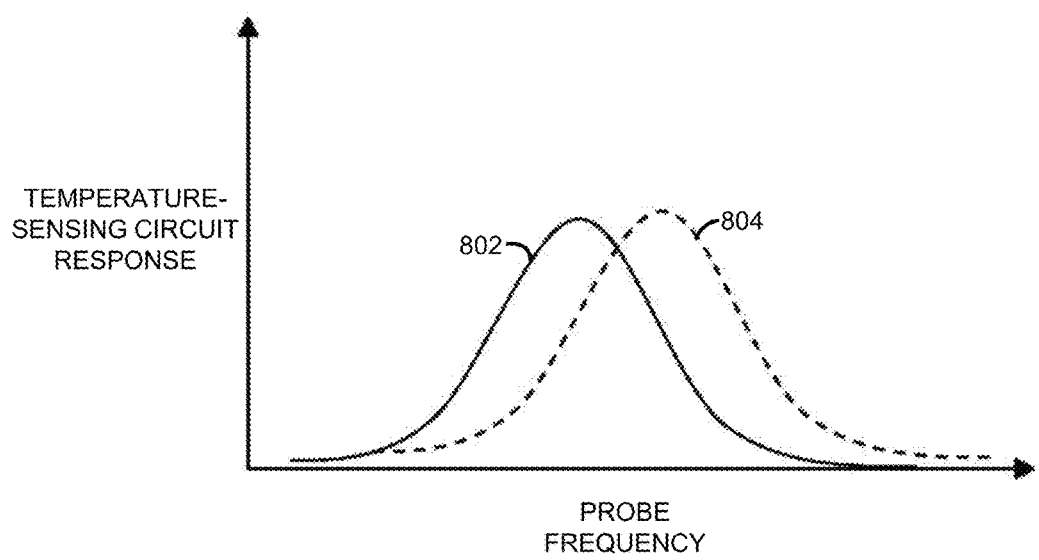
FIG. 8 is a plot showing a simplified response of the temperature-sensing circuit of FIG. 3 as a function of probe frequency.

Referring now to FIG. 8, a plot is presented showing an illustrative response of the temperature-sensing circuit 312 as a function of probe frequency for two different temperatures. In the illustrative example, the response curve is represented by solid line 802 at a first temperature. Starting from a low frequency below the resonance frequency, the temperature-sensing circuit 312 has a low-magnitude response. As the frequency increases, the response of the temperature-sensing circuit 312 increases as well, until the resonance frequency is reached. After the resonance frequency is reached, the magnitude of the response of the temperature-sensing circuit 312 decreases as the frequency increases. In the illustrative example, the response curve is shifted to a higher frequency for a higher temperature, as represented by dashed line 804. In other embodiments, the response curve may be shifted to a lower frequency for a higher temperature.

Examples

Illustrative examples of the devices, systems, and methods disclosed herein are provided below. An embodiment of the devices, systems, and methods may include any one or more, and any combination of, the examples described below.

Example 1 includes a processor for monitoring an internal temperature, the processor comprising one or more processor cores; a voltage regulator, wherein the voltage regulator comprises a voltage regulator inductor; a temperature-sensing circuit comprising a capacitor thermally coupled to the voltage regulator inductor, wherein the temperature-sensing circuit has an inductance; a probe circuit to measure a resonance frequency of the temperature-sensing circuit and determine a temperature of the processor based on the resonance frequency.

Example 2 includes the subject matter of Example 1, and wherein the probe circuit is further to calibrate the temperature-sensing circuit.

Example 3 includes the subject matter of any of Examples 1 and 2, and wherein the resonance frequency of the temperature-sensing circuit at a target temperature is at least twice a switching frequency of the voltage regulator.

Example 4 includes the subject matter of any of Examples 1-3, and wherein the inductance comprises a second inductance from an inductor.

Example 5 includes the subject matter of any of Examples 1-4, and wherein the capacitor is temperature-dependent.

Example 6 includes the subject matter of any of Examples 1-5, and wherein the capacitor is located about 200 micrometers from the voltage regulator inductor.

Example 7 includes the subject matter of any of Examples 1-6, and wherein the capacitor occupies an area less than 0.1 square millimeters.

Example 8 includes the subject matter of any of Examples 1-7, and wherein the probe circuit is further to provide a signal to one processor core of the one or more processor cores of the processor based on the temperature.

Example 9 includes the subject matter of any of Examples 1-8, and wherein the one processor core of the one or more processor cores of the processor is configured to adjust an operational characteristic in response to the signal.

Example 10 includes the subject matter of any of Examples 1-9, and wherein the inductance consists essentially of a parasitic inductance.

Example 11 includes the subject matter of any of Examples 1-10, and wherein the temperature-sensing circuit is arranged such that a first primary axis of a first magnetic field created by the temperature-sensing circuit is perpendicular with a second primary axis of a second magnetic field created by the voltage regulator inductor.

Example 12 includes a method for monitoring a temperature of a processor of a computing device, the method comprising determining a resonance frequency of a temperature-sensing circuit of the processor, wherein the temperature-sensing circuit has an inductance and includes a capacitor thermally coupled to a voltage regulator inductor of the processor; and determining the temperature of the processor based on the resonance frequency.

Example 13 includes the subject matter of Example 12, and further including calibrating the temperature-sensing circuit.

Example 14 includes the subject matter of any of Examples 12 and 13, and wherein the resonance frequency of the temperature-sensing circuit at a target temperature is at least twice a switching frequency of a voltage regulator that includes the voltage regulator inductor.

Example 15 includes the subject matter of any of Examples 12-14, and wherein the inductance comprises a second inductance from an inductor.

Example 16 includes the subject matter of any of Examples 12-15, and wherein the capacitor is temperature-dependent.

Example 17 includes the subject matter of any of Examples 12-16, and wherein the capacitor is located about 200 micrometers from the voltage regulator inductor.

Example 18 includes the subject matter of any of Examples 12-17, and wherein the capacitor occupies an area less than 0.1 square millimeters.

Example 19 includes the subject matter of any of Examples 12-18, and further including providing a signal to a processor core of the processor based on the temperature.

Example 20 includes the subject matter of any of Examples 12-19, and further including adjusting an operational characteristic of the processor core in response to the signal.

Example 21 includes the subject matter of any of Examples 12-20, and wherein the inductance consists essentially of a parasitic inductance.

Example 22 includes the subject matter of any of Examples 12-21, and wherein the temperature-sensing circuit is arranged such that a first primary axis of a first magnetic field created by the temperature-sensing circuit is perpendicular with a second primary axis of a second magnetic field created by the voltage regulator inductor.

Example 23 includes one or more machine readable storage media comprising a plurality of instructions stored thereon that, when executed, cause a processor to perform the method of any of Examples 12-22.

Example 24 includes a processor for monitoring an internal temperature, the processor comprising means for determining a resonance frequency of a temperature-sensing circuit of the processor, wherein the temperature-sensing circuit has an inductance and includes a capacitor thermally coupled to a voltage regulator inductor of the processor; and means for determining the temperature of the processor based on the resonance frequency.

Example 25 includes the subject matter of Example 24, and further including means for calibrating the temperature-sensing circuit.

Example 26 includes the subject matter of any of Examples 24 and 25, and wherein the resonance frequency of the temperature-sensing circuit at a target temperature is at least twice a switching frequency of a voltage regulator that includes the voltage regulator inductor.

Example 27 includes the subject matter of any of Examples 24-26, and wherein the inductance comprises a second inductance from an inductor.

Example 28 includes the subject matter of any of Examples 24-27, and wherein the capacitor is temperature-dependent.

Example 29 includes the subject matter of any of Examples 24-28, and wherein the capacitor is located about 200 micrometers from the voltage regulator inductor.

Example 30 includes the subject matter of any of Examples 24-29, and wherein the capacitor occupies an area less than 0.1 square millimeters.

Example 31 includes the subject matter of any of Examples 24-30, and further including means for providing a signal to a processor core of the processor based on the temperature.

Example 32 includes the subject matter of any of Examples 24-31, and further including means for adjusting an operational characteristic of the processor core in response to the signal.

Example 33 includes the subject matter of any of Examples 24-32, and wherein the inductance consists essentially of a parasitic inductance.

Example 34 includes the subject matter of any of Examples 24-33, and wherein the temperature-sensing circuit is arranged such that a first primary axis of a first magnetic field created by the temperature-sensing circuit is perpendicular with a second primary axis of a second magnetic field created by the voltage regulator inductor.

The invention claimed is:

1. A processor for monitoring an internal temperature, the processor comprising:
   one or more processor cores;
   a voltage regulator, wherein the voltage regulator comprises a voltage regulator inductor;
   a temperature-sensing circuit comprising a capacitor thermally coupled to the voltage regulator inductor, wherein the temperature-sensing circuit has an inductance;
   a probe circuit to measure a resonance frequency of the temperature-sensing circuit and determine a temperature of the processor based on the resonance frequency.

2. The processor of claim 1, wherein the probe circuit is further to calibrate the temperature-sensing circuit.

3. The processor of claim 2, wherein to calibrate the temperature-sensing circuit comprises:
   determine, based on a second temperature-sensing circuit different from the temperature-sensing circuit, a second temperature of the processor at the approximate time when the processor is powered on;

compare the second temperature that is based on the second temperature-sensing circuit with the temperature that is based on the temperature-sensing circuit; and calibrate the temperature-sensing circuit based on the comparison of the second temperature with the temperature.

4. The processor of claim 1, wherein the resonance frequency of the temperature-sensing circuit at a target temperature is at least twice a switching frequency of the voltage regulator.

5. The processor of claim 1, wherein the inductance comprises a second inductance from an inductor.

6. The processor of claim 1, wherein the capacitor is located about 200 micrometers from the voltage regulator inductor.

7. The processor of claim 1, wherein the capacitor occupies an area less than 0.1 square millimeters.

8. The processor of claim 1, wherein the probe circuit is further to provide a signal to one processor core of the one or more processor cores of the processor based on the temperature, and wherein the one processor core of the one or more processor cores of the processor is configured to adjust an operational characteristic in response to the signal.

9. The processor of claim 1, wherein the temperature-sensing circuit is arranged such that, during operation, a first primary axis of a first magnetic field created by the temperature-sensing circuit is perpendicular with a second primary axis of a second magnetic field created by the voltage regulator inductor.

10. One or more non-transitory machine readable storage media comprising a plurality of instructions stored thereon that, when executed, cause a processor to:

determine a resonance frequency of a temperature-sensing circuit of the processor, wherein the temperature-sensing circuit has an inductance and includes a capacitor thermally coupled to a voltage regulator inductor of the processor; and determine the temperature of the processor based on the resonance frequency.

11. The one or more non-transitory machine readable storage media of claim 10, wherein the plurality of instructions further cause the processor to calibrate the temperature-sensing circuit.

12. The one or more non-transitory machine readable storage media of claim 10, wherein the resonance frequency of the temperature-sensing circuit at a target temperature is at least twice a switching frequency of a voltage regulator that includes the voltage regulator inductor.

13. The one or more non-transitory machine readable storage media of claim 10, wherein the inductance comprises a second inductance from an inductor.

14. The one or more non-transitory machine readable storage media of claim 10, wherein the capacitor is temperature-dependent.

15. The one or more non-transitory machine readable storage media of claim 10, wherein the capacitor is located about 200 micrometers from the voltage regulator inductor.

16. The one or more non-transitory machine readable storage media of claim 10, wherein the capacitor occupies an area less than 0.1 square millimeters.

17. The one or more non-transitory machine readable storage media of claim 10, wherein the plurality of instructions further cause the processor to:

provide a signal to a processor core of the processor based on the temperature; and adjust an operational characteristic of the processor core in response to the signal.

18. A method for monitoring a temperature of a processor of a computing device, the method comprising:

determining a resonance frequency of a temperature-sensing circuit of the processor, wherein the temperature-sensing circuit has an inductance and includes a capacitor thermally coupled to a voltage regulator inductor of the processor; and determining the temperature of the processor based on the resonance frequency.

19. The method of claim 18, further comprising calibrating the temperature-sensing circuit.

20. The method of claim 18, wherein the resonance frequency of the temperature-sensing circuit at a target temperature is at least twice a switching frequency of a voltage regulator that includes the voltage regulator inductor.

21. The method of claim 18, wherein the inductance comprises a second inductance from an inductor.

22. The method of claim 18, wherein the capacitor is temperature-dependent.

23. The method of claim 18, wherein the capacitor is located about 200 micrometers from the voltage regulator inductor.

24. The method of claim 18, wherein the capacitor occupies an area less than 0.1 square millimeters.

25. The method of claim 18, further comprising:

providing a signal to a processor core of the processor based on the temperature; and adjusting an operational characteristic of the processor core in response to the signal.

* * * * *